United States Patent [19]
Pike

[11] Patent Number: 4,740,190
[45] Date of Patent: Apr. 26, 1988

[54] VARIABLE RATIO BICYCLE CHAIN DRIVE

[75] Inventor: Joseph A. Pike, Palm Beach Gardens, Fla.

[73] Assignee: University of Florida, Gainesville, Fla.

[21] Appl. No.: 7,974

[22] Filed: Jan. 29, 1987

[51] Int. Cl.⁴ .............................................. F16H 55/30
[52] U.S. Cl. ........................................ 474/49; 474/56
[58] Field of Search ................. 474/49, 50, 52, 54–57, 474/141

[56] References Cited

U.S. PATENT DOCUMENTS

| | | | |
|---|---|---|---|
| 758,474 | 4/1904 | Reed | 474/52 |
| 1,126,195 | 1/1915 | Granz | 474/52 |
| 4,030,373 | 6/1977 | Leonard | 474/53 |
| 4,065,032 | 12/1977 | Lydiksen | 74/837 X |
| 4,068,539 | 1/1978 | Nye | 474/50 |
| 4,129,044 | 12/1978 | Erickson et al. | 474/55 |
| 4,451,207 | 6/1985 | Husted | 416/237 |
| 4,493,678 | 1/1985 | Husted | 474/49 X |

Primary Examiner—Stephen J. Novosad
Assistant Examiner—Thuy M. Bui
Attorney, Agent, or Firm—Dennis P. Clarke

[57] ABSTRACT

A variable ratio bicycle chain drive uses a variable radius sprocket assembly having a number of chain engagement elements mounted to worm gears for movement along radial channels. Radius changer gears, such as star wheels, are mounted on at least some worm gears to cause them to rotate upon contact with teeth of a switch. Drive gears are connected to each other by a center gear and connected to the worm gears to ensure that all worm gears rotate in unison.

24 Claims, 5 Drawing Sheets

VARIABLE RATIO BICYCLE CHAIN DRIVE

BACKGROUND OF INVENTION

The present invention relates to a variable ratio bicycle chain drive. More specifically, the present invention relates to a variable ratio bicycle chain drive having a sprocket assembly with a variable radius.

The vast majority of multiple speed bicycles being produced today are of the derailliur/gear cluster design. That design includes an arrangement whereby a chain is selectively engaged with different gears. To change the gear ratio, the derailliur "derails" the chain from one gear and the chain is engaged to another gear. This basic design has been unchanged in recent history.

A variation on the basic derailliur/gear cluster design has used one or more fixed radius elliptical gears or sprockets such that the effective gear ratio varies with the bicycle rider's leg position.

A product was recently introduced which uses a front radial drive gear which is capable of expanding and contracting in diameter in order to change the gearing ratio. This new design eliminates the need for bulky gear clusters in the rear of the bicycle. Disadvantageously, changing to a lower gear ratio requires back pedaling, thereby interrupting the drive power.

The following patents show various adjustable diameter mechanisms:

| U.S. Pat. No. | Inventor | Issue Date |
| --- | --- | --- |
| 758,474 | Reed | 4/26/04 |
| 1,126,195 | Granz | 1/26/15 |
| 4,030,373 | Leonard | 6/21/77 |
| 4,065,032 | Lydiksen | 12/27/77 |
| 4,068,539 | Nye | 1/17/78 |
| 4,129,044 | Erickson et al. | 12/12/78 |
| 4,493,678 | Husted | 1/15/85 |
| 4,521,207 | Husted | 6/04/85 |

The Reed patent shows a speed changing mechanism having radially adjustable rim sections using disks with spiral grooves.

The Granz patent discloses a pulley having adjustable rim sections mounted upon worm gears and having bevelled wheels coaxially attached to the worm gears.

The Leonard patent discloses a variable diameter transmission arrangement wherein a number of movable sheave elements are adjustable in corresponding tracks by way of friction wheels turning pinions. The pinions engage gears to rotate threaded rods upon which the sheave members are mounted.

The Lydiksen patent shows a container filling machine having a pinion gear which drives a threaded shaft upon which a cam is mounted. The pinion cooperates with one of two rows of teeth in order to adjust the cam position upon the threaded shaft.

The Nye patent discloses a variable transmission including an adjustable diameter pulley cooperating with a friction belt. One of the embodiments uses radially extending worm gears upon which adjustable traveler blocks are mounted. At interior ends of the worm gears are bevel gears which are coupled together by a central gear for rotation in unison.

The Erickson patent has a variable gear ratio chain drive system wherein chain engagement elements are mounted upon shafts which extend through channels within two plates. The two plates are moved along the length of the shafts so as to vary the position of the chain engagement elements, thereby changing the radius of the sprocket.

The two Husted patents disclose a variable radius sprocket arrangement wherein a number of chain engagement elements may be secured at various locations along corresponding spiral slots, the chain engagement elements moving in radial keyways. The spiral slots are in a wheel normally coupled for rotation with the wheel having the radial keyways, but the wheel with the spiral slots may move relative to the other wheel by use of a brake system, thereby allowing one to change the gear ratio depending upon the pedaling of the bicycle. These patents generally correspond with the commercial product referred to above wherein back pedaling is required to change the gear ratio in a particular direction.

Although previous variable ratio bicycle chain drives using variable radius sprockets have provided a wider variety of gearing ratios than the more commonly used derailliur/gear cluster arrangements, such prior arrangements have often been subject to one or more of several disadvantages. They are often complex in construction, thereby increasing difficulty in the cost of manufacturing and assembly. Some prior variable radius sprockets for bicycle transmissions require extra wide construction, thereby sticking out substantially from the bicycle frame. Some designs are sufficiently unusual in operation and/or structure as to require bicycle frame modification. A further disadvantage of some designs is that the rider must change his or her pedalling in order to change gears. Such an interruption of drive power makes such prior systems unsuitable for racing bicycle designs. Another disadvantage of many prior art designs is that they add excess weight to the bicycle, again limiting the usefulness of such transmissions. An additional disadvantage of some prior art designs is that they do not permit the chain to align properly in all gearing ratios. This skewed, or non-linear tracking produces the grinding and chain "chatter" commonly associated with multi-speed bicycles.

OBJECTS AND SUMMARY OF THE INVENTION

Accordingly, it is a primary object of the present invention to provide a new and improved variable ratio bicycle chain drive having a variable radius sprocket.

A more specific object of the present invention is to provide a variable ratio bicycle chain drive system wherein the gear ratio may be switched even while pedalling the bicycle in normal fashion.

Another object of the present invention is to provide a variable ratio bicycle chain drive system which is relatively low in weight and small in dimension.

A further object of the present invention is to provide a variable ratio bicycle chain drive system having dimensions and a mode of operation which allow its use with standard bicycle frames.

A further object of the present invention is to provide a variable ratio bicycle chain drive system having non-slip transmittal of power and non-slip setting of the gear ratio.

A still further object of the present invention is to provide a variable ratio bicycle chain drive system which provides for convenient switching of the gear ratio.

Yet another object of the present invention is to provide a variable ratio bicycle chain drive system which provides for sequential gear changes continuously over a given range and allows constant linear tracking.

The above and other objects of the present invention which will become more apparent as the description proceeds are realized by a variable ratio bicycle chain drive system comprising:

a variable radius sprocket assembly having:

a support plate defining a plane;

a plurality of chain engagement elements including at least some chain drivers, each of the chain engagement elements supported by the support plate for movement along a corresponding one of a plurality of radii extending out from a center, the effective radius of the sprocket assembly varying with the radial movement of the chain engagement elements;

connecting means operative to ensure that radial movement of one of the chain engagement elements will in turn cause corresponding movement of the remaining of the chain engagement elements;

a plurality of radius changers, each radius changer supported by the support plate and disposed at an outer point of a corresponding one of the radii and movable to cause movement of a corresponding one of the chain engaging elements;

a switch mountable upon a bicycle frame and operable for changing the effective radius of the sprocket assembly.

The switch is movable in a direction normal to the plane to switchably contact the radius changers, the switch contacting less than all of the radius changers at any particular time. The sprocket assembly is rotatable about the center and the switch is switchable to cause movement of the radius changers relative to the support plate such that movement of each radius changer causes a change in radius of the corresponding chain engagement element which causes movement of the connecting means to in turn move the other chain engagement elements. The position of the switch is independent of any rotation of the sprocket assembly, meaning that the switch does not rotate with the sprocket assembly. The connecting means includes a plurality of drive gears, each drive gear corresponding to one of the plurality of radii and mounted radially inward of a corresponding one of a chain engaging elements. The radii are parallel to the plane defined by the support plate. Rotation of each drive gear radially moves the corresponding chain engagement element. Each of the drive gears is drivably connected to a center gear mounted for rotation relative to said support plate. Each of the radius changers is a radius changer gear and the switch includes a number of teeth to engage the radius changer gears. The switch includes first and second rows of teeth to engage the radius changer gears. Upon movement of the switch in a first direction from a neutral position, the first row of teeth will engage the radius changer gears to reduce the effective radius of the sprocket assembly. Upon movement of the switch in a second direction, opposite the first direction, from the neutral position, the second row of teeth will engage the radius change gears to increase the effective radius of the sprocket assembly. Each of the chain engagement elements is mounted for movement along a corresponding radial channel. Each of the chain engagement elements is mounted to a corresponding worm gear. Each of the rows of teeth extend in a curve and the rows are separated from each other in a direction normal to the plane. Movement of the switch is operable during rotation of the sprocket assembly to allow gear ratio changing during normal pedalling of a bicycle. The system provides a continuously adjustable gear ratio over a given range. The sprocket assembly may have an elliptical form. The invention further includes a bicycle having the variable ratio bicycle chain drive system discussed above.

The invention may alternately be described as a variable ratio chain drive system comprising:

a variable radius sprocket assembly and a switch mountable upon a bicycle frame and operable for changing the effective radius of the sprocket assembly. The sprocket assembly has:

a support plate defining a plane;

a plurality of worm gears supported by the support plate and extending radially out from a center;

a plurality of chain engagement elements, each chain engagement element mounted for movement along a corresponding one of the worm gears, at least some of the chain engagement elements being chain drivers;

a plurality of drive gears, each drive gear mounted at an inner end of a corresponding one of the worm gears, the drive gears operably connected for rotation in unison.

The switch is operable to rotate at least one of the worm gears to drive a corresponding drive gear which in turn drives other of the drive gears to cause rotation of the worm gears corresponding to the other drive gears and rotation of the worm gears causes the chain engaging elements to move in a radial direction. The sprocket assembly further comprises a plurality of radius changers, each radius changer supported by the support plate and disposed at an outer point at a corresponding one of the worm gears and movable to cause movement of a corresponding one of the chain engagement elements. Each of the chain engagement elements is mounted for movement along a corresponding radial channel, each channel having radially extending walls integral with the support plate and projecting normal to the plane.

BRIEF DESCRIPTION OF THE DRAWINGS

The above and other features and advantages of the present invention will be more readily understood when the following detailed description is considered in conjunction with the accompanying drawings wherein like characters represent like parts throughout the several views and in which.

DETAILED DESCRIPTION

Figure 1:
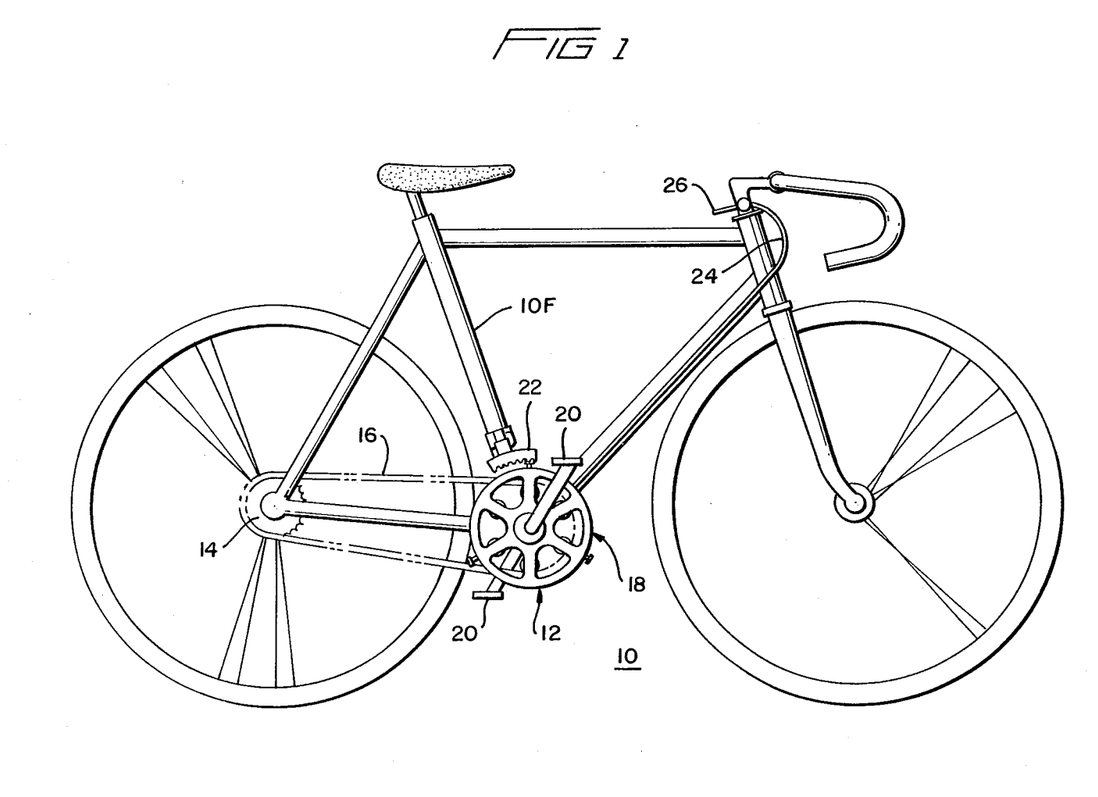
FIG. 1 shows a simplified side view of a bicycle and variable ratio bicycle chain drive system according to the present invention.

FIG. 1 shows a bicycle 10 according to the present invention. As numerous of the components of the bicycle 10 such as wheels, handlebar, frame, and seat, are conventional in structure, the present application will concentrate on components making up a variable ratio bicycle chain drive system 12 according to the present invention.

The drive system 12 includes a rear sprocket 14 connected by a chain 16 to a variable radius sprocket assembly 18. The variable radius sprocket assembly or front sprocket 18 is operably connected for turning by the foot power from a passenger applied to pedals 20 connected to the sprocket 18 in conventional fashion. The front sprocket 18 is adjustable in radius by a switch 22 controlled by cable 24. Cable 24 is in turn operated by gear shift lever 26.

Figure 2:
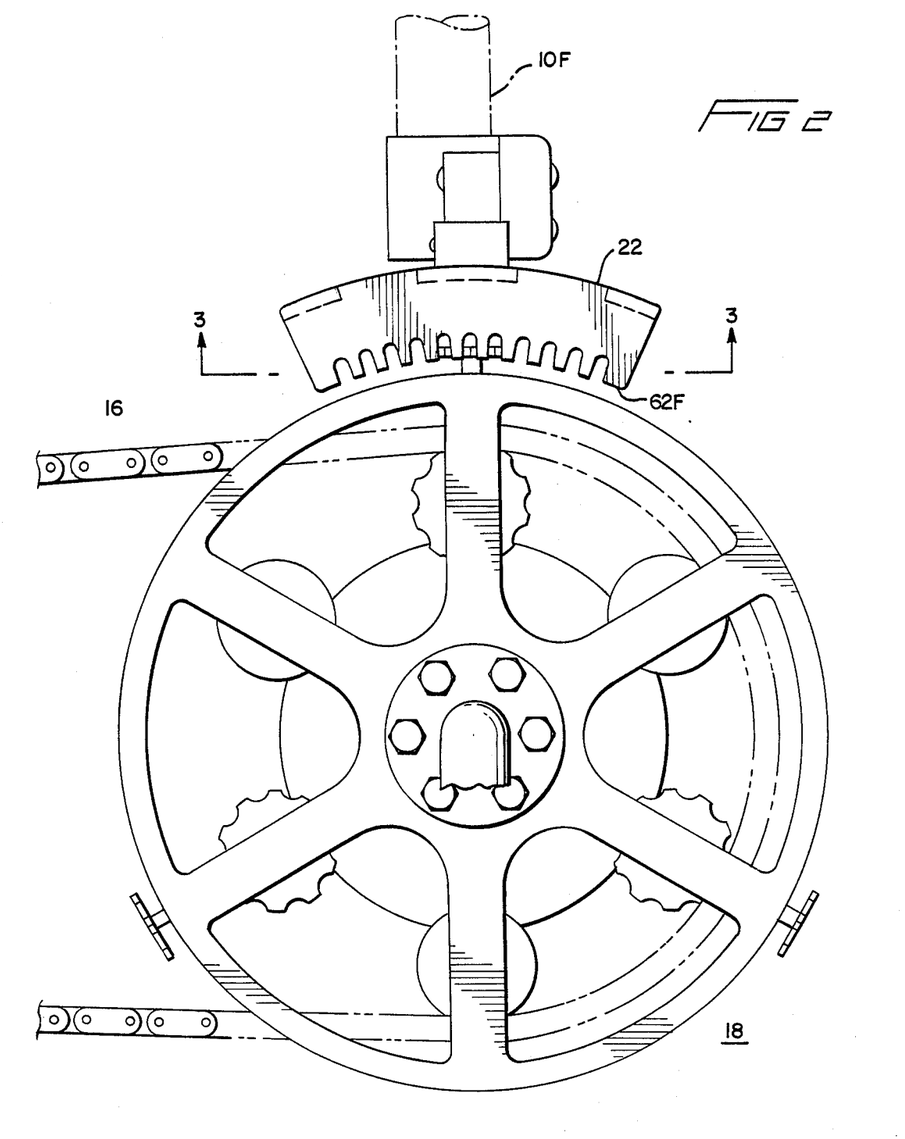
FIG. 2 shows a side view of the variable ratio bicycle chain drive.
Figure 4:
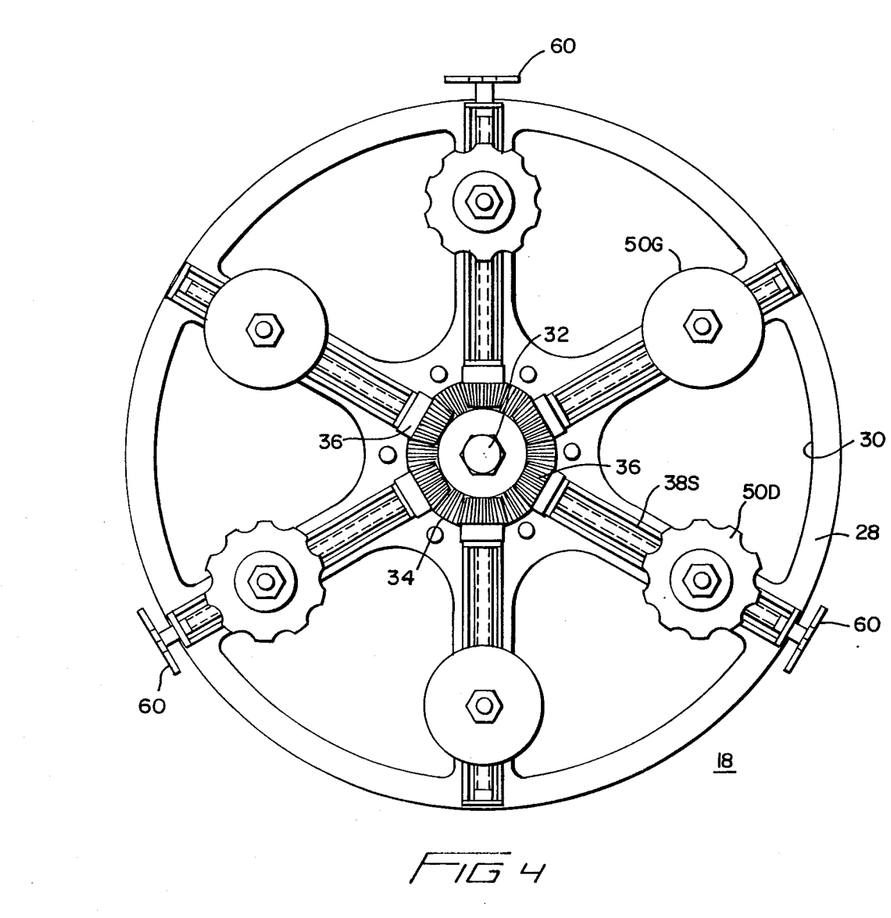
FIG. 4 shows a side view of the adjustable radius sprocket assembly of the present invention from the opposite direction of the FIG. 2 view.

The front sprocket assembly 18 is shown in more detail in FIGS. 2 and 4. The sprocket assembly 18 includes a support plate 28 which may include six cutout portions 30 in order to make it a relatively low weight. Preferably, the support plate 28 is made of a light weight metal alloy of a type often used for bicycle parts in the last few years.

Mounted at a center 32 of the circular support plate 28 is a bevelled center gear 34 which meshes with six (6) bevelled drive gears 36 equally spaced around the circumference of center gear 34. (For ease of illustration, not all parts will be labeled for identically constructed parts such as the six drive gears 36.)

Figure 5:
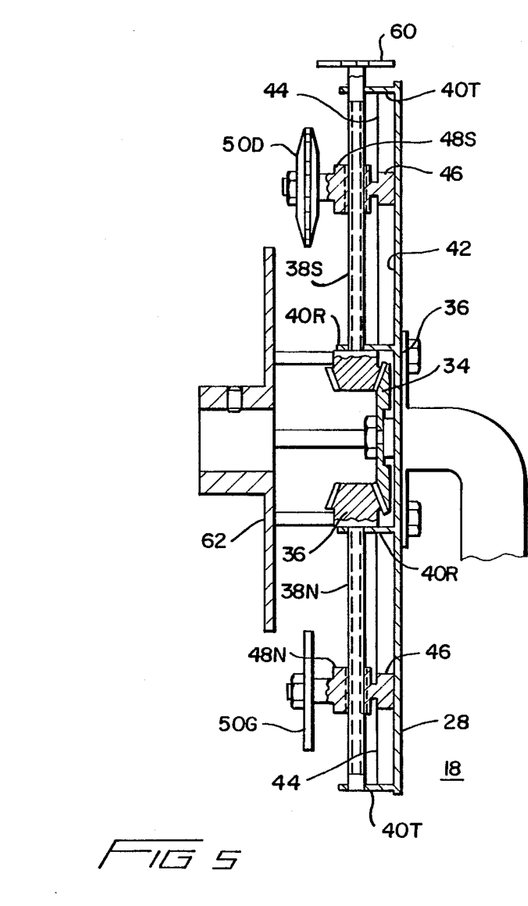
FIG. 5 shows a cross section view of the sprocket assembly of the present invention.

Continuing to view FIGS. 2 and 4, and also considering FIG. 5, each of the drive gears 36 is rotatably mounted upon an inner end of a corresponding worm gear 38S or 38N. Each of the worm gears 38S and 38N is rotatably mounted upon a radially inner channel end wall 40R and a corresponding radially outer channel end wall 40T, the channel end walls projecting perpendicular to the plane defined by the planar portion 42 of the support plate 28. Also projecting perpendicularly to the planar portion 42 are channel side walls 44. Each of the worm gears 38S and 38N extend radially outward from the center 32 and a corresponding pair of side walls 44 are parallel to each of the worm gears to define a channel between the side walls and bounded by the end walls 40R and 40T. Disposed within the channel is a channel follower 46 which maintains a corresponding traveler 48S or 48N in proper orientation as internal threads in the traveler allow it to move radially along the worm gear 38S or 38N when the worm gear rotates. For ease of illustration, the threads on the worm gears 38S and 38N and the threads internal to travelers are not shown.

All of the six travelers 48S and 48N have chain engagement elements mounted upon them. The three travelers labeled 48N include planar chain guides 50G which are disposed in a plane parallel to the planar portion 42 of support plate 28. The chain guide 50G may be attached by a nut as shown in FIG. 5 to the traveler 48N. Alternately, the traveler 48N may include a bolt extending upwardly and have nuts upon both sides of the chain guide 50G to hold it in place.

Mounted upon each of the three travelers 48S is a chain driver 50D disposed in a common plane with the chain guides 50G and with the chain 16 (FIGS. 1 and 2 only), this plane being parallel to the planar portion 42.

Figure 6:
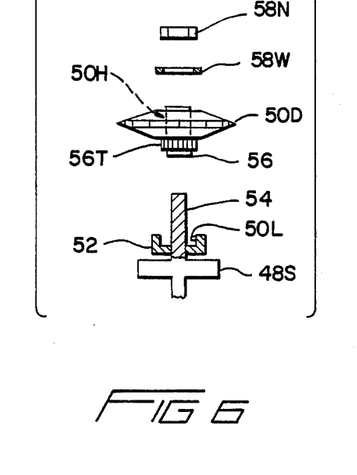
FIG. 6 shows a partial exploded view of a chain driver arrangement.

FIG. 5 has a simplified showing of the mounting of chain driver 50D upon traveler 48S, but the details of a preferred type of mounting are shown in FIG. 6 which is a side view taken from the same direction as FIG. 5. As shown the traveler 48S has an upwardly facing cup 52 (shown in partial cross section) and an upwardly projecting bolt 54 over which a cylindrical collar 56 is placed. The cylindrical collar 56 which functions as a spacer, may be free to rotate relative to the threads of bolt 54. The chain driver 50D has a central hole 50H through which the spacer 56 will extend. Washer 58W and nut 58N lock the spacer 56 and driver 50D rotatably upon the bolt 54.

Although the chain guides 50G may be mounted stationary, the toothed chain drivers 50D may be free to spin in one direction corresponding to forward rotation of the bicycle wheels. This one way mobility allows the chain drivers 50D to self-align with the chain links of chain 16.

Figure 7:
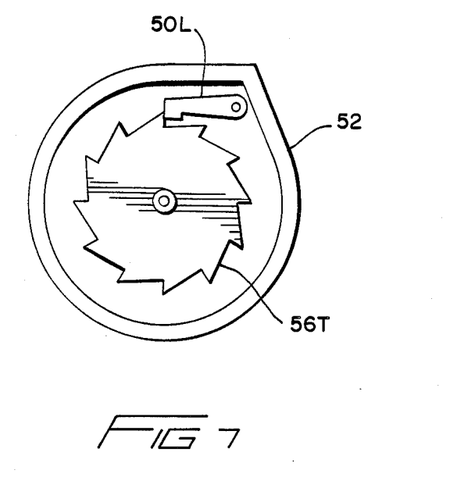
FIG. 7 shows a top view of two parts which together provide a ratcheting feature for the chain drivers.

Although various rachet arrangements could be used for realizing the one-way rotation feature of driver 50D, the simplified arrangement shown in FIGS. 6 and 7 may use a rachet 56T mounted directly to the chain driver 50D. The driver 50D/rachet 56T assembly is fitted over collar 56 which, in turn, is slid over the bolt 54. The collar 56 merely acts as a bushing to facilitate easy rotation of the driver 50D/rachet 56T assembly around the bolt 54. The rachet 56T is seated within the cup 52 wherein one or more pawls 50L are mounted (only one shown). This arrangement of pawl 50L and rachet 56T, as illustrated in FIG. 7, would allow free rotation in the counterclockwise direction, while prohibiting any movement in the clockwise direction.

Referring back to FIGS. 4 and 5, each of the worm gears 38N is rotatably journaled within the walls 40R and 40T and is secured for rotation with a corresponding one of the drive gears 36. As warranted, the radially outer end of the worm gear 38N may include a collar and set screw (not shown) to prevent the worm gear 38N from being displaced from the walls 40T and 40R. Additionally, a collar and set screw (not shown) may be included between the drive gear 36 and the inner wall 40R for proper spacing of the worm gear 38N and its associated drive gear 36.

Every alternate worm gear has been labeled 38S and includes a gear changer star wheel 60 mounted at its radially outer end for rotation with the corresponding worm gear 38S. Thus, and with primary reference to the top part of FIG. 5, the combination of star wheel 60, its corresponding worm gear 38S, and the corresponding drive gear 36 rotate as a unit and are supported by the walls 40T and 40R.

As best shown in FIG. 5, the support plate 28 may have a small back (i.e., closest to bicycle frame) plate 62 bolted to it. The back plate 62 may include a collar and set screw arrangement to allow attachment to the shaft of the bicycle (shaft not shown).

Figure 3:
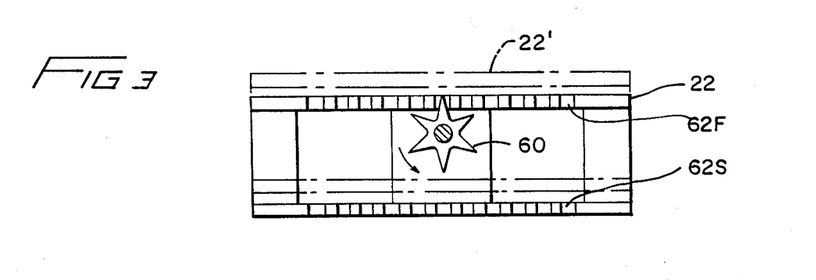
FIG. 3 shows a cross section view taken along lines 3—3 of FIG. 2.

Each of the star wheels 60 engages a first row of teeth 62F when the switch is moved from a neutral position illustrated as 22' in FIG. 3 to a first position shown in solid line in FIG. 3. The switch 22 also includes a second row of teeth 62S which engage the radial changing star wheel type gears 60 when the switch 22 is moved away from the frame from its neutral position 22'. As shown in FIG. 3, the star wheel 60 would be moving from left to right because of rotation of the sprocket assembly 18 in a forward direction (clockwise in the view of FIG. 2 and counterclockwise in the view of FIG. 4). The left to right motion of star wheel 60 tangentially to the sprocket assembly 18 causes the star wheel 60 to rotate counterclockwise relative to the sprocket assembly 18 by virtue of engagement between the teeth of star wheel 60 and the teeth 62F. Of course, the star wheel 60 would rotate clockwise in the view of FIG. 3 if the switch 22 had been moved such that the second row of teeth 62S are engaged by the star wheel 60. In either case, rotation of the star wheel 60 will in turn cause rotation of the corresponding worm gear 38S which, by virtue of the connections between the corresponding bevelled drive gear 36 and the bevelled center gear 34 cause rotation of the other of the drive gears 36. The rotation of the five drive gears 36 other than the particular drive gear whose star wheel has been turned results in rotation of all of the worm gears 38S and 38N, this rotation causing the travelers 48N and 48S to move along the channel between side walls 44 such that the chain engagement elements 50G and 50D move radially to expand or contract the effective radius of the front sprocket 18. It will therefore be appreciated, that rotation of a single of the star wheel 60 at any particular time will cause radial movement of all of the chain engagement elements 50G and 50D. For the preferred embodiment of FIGS. 1–5, each of the chain engagement elements 50G and 50D will be disposed an equal distance from the center 32 at any particular time.

Figure 8:
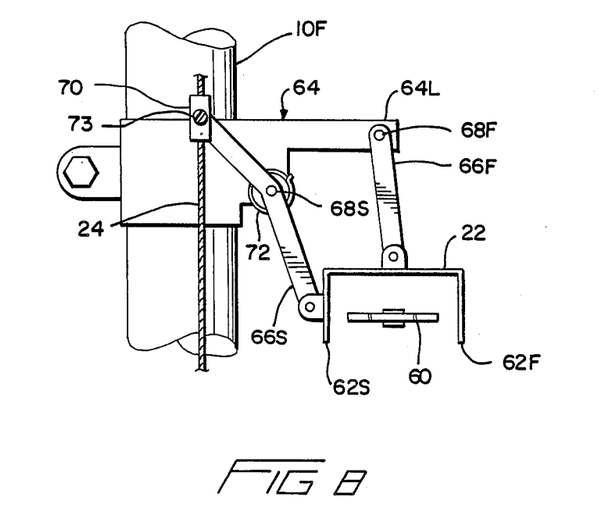
FIG. 8 shows an end view of the switch of the present invention mounted upon a bicycle frame.
Figure 9A:
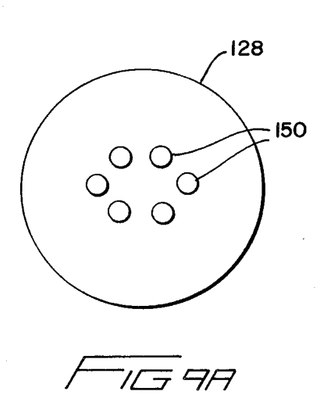
FIGS. 9A–9D schematically represent an elliptical variable sprocket assembly according to the present invention.
Figure 9B:
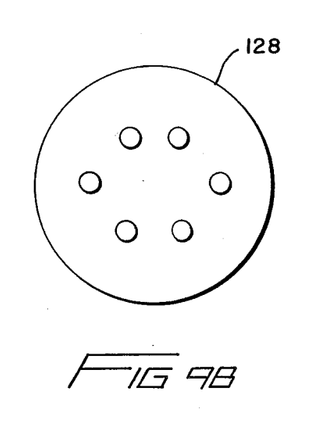
Figure 9C:
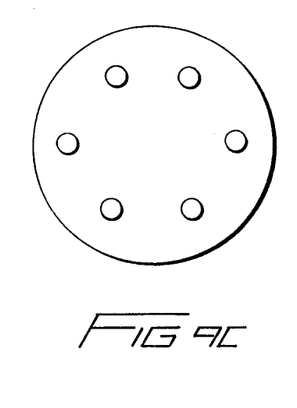
Figure 9D:
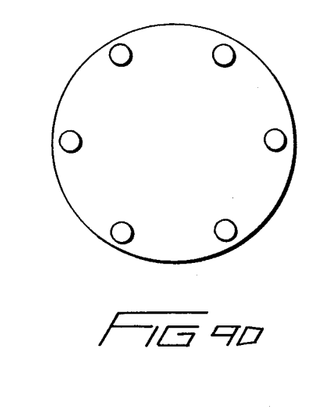

The mounting arrangement for switch 22, as illustrated in FIG. 8, includes a collar 64 secured to the bicycle frame 10F and having first and second links 66F and 66S pivotably fixed to a flange 64L extending out from the collar 64 at corresponding pivot points 68F and 68S. As shown, the arms 66F and 66S are pivotably connected to the switch 22 such that the arms 66F and 66S together with flange 64L and switch 22 form a four-bar linkage, which ensures that the switch 22 maintains the illustrated orientation of FIG. 8 even when the arms 66F and 66S are in different angular positions.

An end of the arm of 66S is secured to the cable 24 by a collar 70 and set screw 73 or other commonly used method. The cable 24 extends through a hole (not visible) in the bottom of member 70 which hole simply serves to maintain the cable 24 in its proper place. The link arm 66S may be attached to the collar 70 via a single rivet or other such similar means which would permit the collar to swivel. A spring 72 normally biases the switch 22 towards the bicycle frame 10F. Alternately, a spring arrangement as commonly used with known derailliur designs could be used to bias the switch 22 towards the bicycle frame 10F.

FIGS. 9A–9D schematically illustrate a planar view of an elliptical gearing arrangement according to the present invention. For ease of discussion, each of the components in FIGS. 9A–9D is labeled with the same last two digits in the "100" series as the corresponding element of the embodiment shown in FIGS. 1–8. In particular, FIGS. 9A–9D schematically illustrate the sequence whereby chain engagement elements 150 may be moved radially outward from an inner elliptical position shown in FIG. 9A. To realize the arrangement of FIGS. 9A–9D, it is simply necessary to mount the travelers (not shown in these FIGS.), in an elliptical configuration initially. Note that as the chain engagement elements 150, which may include a mixture of chain guides and chain drivers or may be completely composed of chain drivers, move outwardly to the position of FIG. 9D, the elipse is less pronounced.

Figure 10A:
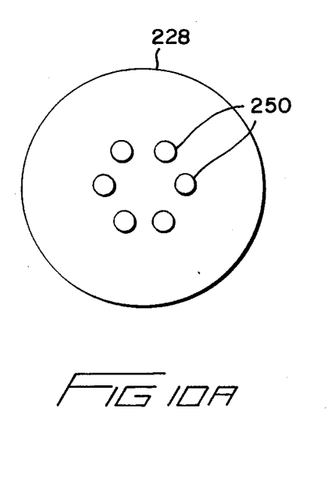
FIGS. 10A–10D are schematic illustrations of an alternate elliptical embodiment of the present sprocket assembly.
Figure 10B:
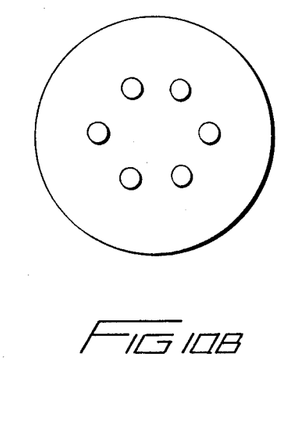
Figure 10C:
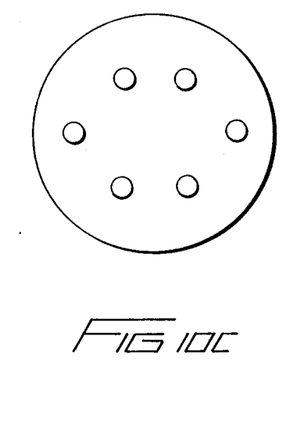
Figure 10D:
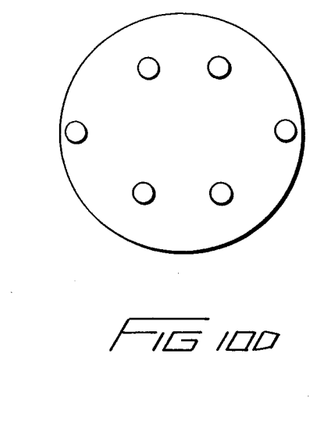

An alternate method of incorporating an elliptical gear by way of the present variable radius sprocket uses travelers (not shown in these figures) which are initially oriented in a circular pattern such that the associated chain engagement elements 250 form a circular pattern at the smaller sprocket diameters (FIG. 10A). However, the worm gears (not shown) may include different pitched threads such that the chain engagement elements 250 move away from the center of the support plate 228 at different rates when rotation is supplied to the star wheels (spreading pattern shown in FIGS. 10A–10D, but star wheels not shown in FIGS. 10A–10D). The result of this arrangement is that the elipse becomes more pronounced as the chain engagement elements 250 are moved radially outward in the sequence of FIGS. 10A to 10D.

The elliptical arrangements of FIGS. 9A–9D and 10A–10D may be used to vary the effective radius of the present sprocket assembly as a function of its rotational position. By properly orienting the ellipse relative to the pedals on the bicycle, the effective gear ratio changes in accord with the operator's leg position so as to provide the most efficient gear ratio.

Operation

The bicycle 10 of the present invention may be operated in quite similar fashion to a regular bicycle. The gear shift lever 26 would normally be kept in a neutral position such that the cable 24 disposes the switch member 22 in its FIG. 8 position. Accordingly, the star wheels 60 will pass between the rows of teeth 62F and 62S in the fashion as shown in FIG. 8. Under these conditions, the chain engagement elements including chain guides 50G and chain drivers 50D will be maintained at a given distance from the center 32 (FIG. 4). The effective radius of the sprocket assembly 18 may be changed by moving the gear lever 26 in either of two directions from its neutral position. When the gear lever 26 is moved in one direction, the cable 24 is pulled so as to move the switch 22 (see especially FIG. 8) away from the frame 10F until the curved row of teeth 62S engage star wheels 60 moving between the side walls of channel 22. Engagement of the star wheels 60 with the teeth 62S causes rotation of the star wheel 60 which in turn rotates the corresponding worm gear 38S and drive gear 36. The drive gear 36 in turn rotates the center gear 34 relative to support plate 28 (refer to FIG. 5), the center gear 34 transmitting this motion to each of the other five drive gears 36 in turn moving the corresponding worm gears 38S and 38N. Rotation of all six worm gears in turn results in movement of the travelers 48S and 48N along the radii corresponding to the worm gears. This will of course change the effective radius of the sprocket assembly 18. Note that the teeth 62S are disposed slightly below the starwheel 60 in FIG. 8 to compensate for the slight upward movement of switch 22 when it is moved rightwardly from the position in FIG. 8.

If the operator of the bicycle had instead loosened the slack on the cable 24 by moving the gear shift lever 26 in a direction opposite to the direction for tightening the cable 24, the spring 72 would cause the switch 22 to move closer to frame 10F from the position shown in FIG. 8 such that the star wheels 60 would contact the curved row of teeth 62F. This in turn causes each of the star wheels 60 to rotate in the opposite direction from their rotation when engaging teeth 62S. The engagement between the curved row of teeth 62F, which are disposed in a plane parallel to the plane of the curved row of teeth 62S and which is parallel to the plane of the chain 16, causes radial movement of the chain engagement elements including chain guides 50G and chain drivers 50D along the associated worm gears. The arrangement for transmitting rotation of the star wheels 60 into a change in the effective radius of the sprocket assembly 18 is the same independent of the direction of rotation of the star wheels 60. Although three star wheels 60 are shown, one could alternately use more or less of the star wheels depending upon how quickly one would want to change gearing ratios. The gear shift lever 26 should be moved back to a neutral position as soon as the sprocket assembly 18 had assumed the desired gearing ratio.

Although various specific constructions and materials have been disclosed for the preferred embodiments of the present invention, it will be readily appreciated that these are for illustrative purposes only. Various modifications and adaptations will be readily apparent to those of skill in the art. Accordingly, the scope of the present invention should be determined by reference to the claims appended hereto.

What is claimed is:

1. A variable ratio bicycle chain drive system comprising:
   (a) a variable radius sprocket assembly having:
      (i) a support plate defining a plane;
      (ii) a plurality of chain engagement elements including at least some chain drivers, each of said chain engagement elements supported by said support plate for movement along a corresponding one of a plurality of radii extending out from a center, the effective radius of said sprocket assembly varying with radial movement of said chain engagement elements;
      (iii) connecting means operative to insure that the chain engagement elements move radially in unison;
      (iv) a plurality of radius changers, each radius changer supported by said support plate and disposed at an outer point of a corresponding one of said radii and movable to cause movement of a corresponding one of said chain engagement elements;
   (b) a switch mountable upon a bicycle frame and operable for changing the effective radius of said sprocket assembly; and
   wherein said switch is movable to switchably contact said radius changers, said switch contacting less than all of said radius changers at any particular time, said sprocket assembly being rotatable about said center and said switch is switchable to cause movement of said radius changers relative to said support plate such that movement of each radius changer causes a change in radius of the corresponding chain engagement element and causes movement of said connecting means to in turn move the other chain engagement elements.

2. The variable ratio bicycle chain drive system of claim 1 wherein the position of said switch is independent of any rotation of said sprocket assembly.

3. The variable ratio bicycle chain drive system of claim 1 wherein said connecting means includes a plurality of drive gears, each drive gear corresponding to one of said plurality of radii and mounted radially inward of a corresponding one of said chain engagement elements, and rotation of each drive gear radially moves the corresponding chain engagement element.

4. The variable ratio bicycle chain drive system of claim 3 wherein said connecting means further includes a center gear mounted for rotation relative to said support plate, and each of said drive gears is drivably connected to said center gear.

5. The variable ratio bicycle chain drive system of claim 3 wherein each of said radius changers is a radius changer gear and said switch includes a number of teeth to engage with said radius changer gears.

6. The variable ratio bicycle chain drive system of claim 5 wherein said switch includes first and second rows of teeth to engage said radius changer gears and, upon movement of said switch in a first direction from a neutral position, said first row of teeth will engage said radius changer gears to reduce the effective radius of said sprocket assembly, and upon movement of said switch in a second direction, generally opposite said first direction, from said neutral position, said second row of teeth will engage said radius changer gears to increase the effective radius of said sprocket assembly.

7. The variable ratio bicycle chain drive system of claim 3 wherein each of chain engagement elements is mounted for movement along a corresponding radial channel.

8. The variable ratio bicycle chain drive system of claim 7 wherein said connecting means further includes a plurality of worm gears and each of said chain engagement elements is mounted to a corresponding one of said worm gears.

9. The variable ratio bicycle chain drive system of claim 1 wherein said switch includes two rows of teeth, each row extending in a curve and separated from the other row in a direction normal to said plane.

10. The variable ratio bicycle chain drive system of claim 1 wherein movement of said switch is operable during rotation of said sprocket assembly to allow both increase and decrease of the gear ratio during normal pedaling of a bicycle for continuous drive power.

11. The variable ratio bicycle chain drive system of claim 1 wherein said switch includes teeth which are moved in a direction perpendicular to said plane upon switching of said switch.

12. The variable ratio bicycle chain drive system of claim 1 wherein the gear ratio is continuously adjustable over a given range.

13. The variable ratio bicycle chain drive system of claim 1 wherein said sprocket assembly has an elliptical form.

14. A bicycle having the variable ratio bicycle chain drive system of claim 1.

15. A variable ratio bicycle chain drive system comprising:
   (a) a variable radius sprocket assembly having:
      (i) a support plate defining a plane;
      (ii) a plurality of worm gears supported by said support plate and extending radially out from a center;
      (iii) a plurality of chain engagement elements, each chain engagement element mounted for movement along a corresponding one of said worm gears, at least some of said chain engagement elements being chain drivers;
      (iv) a plurality of drive gears, each drive gear mounted at an inner end of a corresponding one of said worm gears, said drive gears operably connected for rotation in unison; and (b) a switch mountable upon a bicycle frame and operable for changing the effective radius of said sprocket assembly; and wherein said switch is operable to rotate at least one of said worm gears to drive a corresponding drive gear which in turn drives other of said drive gears to cause rotation of the worm gears corresponding to said other drive gears and rotation of said worm gears causes said chain engagement elements to move in a radial direction.

16. The variable ratio bicycle chain drive system of claim 15 wherein each of said drive gears is drivably connected to a center gear mounted for rotation relative to said support plate.

17. The variable ratio bicycle chain drive system of claim 16 wherein said sprocket assembly further comprises a plurality of radius changers, each radius changer supported by said support plate and disposed at an outer point of a corresponding one of said worm gears and movable to cause movement of a corresponding one of said chain engagement elements.

18. The variable ratio bicycle chain drive system of claim 17 wherein each of chain engagement elements is mounted for movement along a corresponding radial channel.

19. The variable ratio bicycle chain drive system of claim 18 wherein each of said channels is a channel having radially extending walls integral with said support plate and projecting normal to said plane.

20. The variable ratio bicycle chain drive system of claim 17 wherein each of said radius changers is a radius changer gear.

21. The variable ratio bicycle chain drive system of claim 20 wherein said switch includes first and second rows of teeth to engage said radius changer gears and, upon movement of said switch in a first direction from a neutral position, said first row of teeth will engage said radius changer gears to reduce the effective radius of said sprocket assembly, and upon movement of said switch in a second direction, generally opposite said first direction, from said neutral position, said second row of teeth will engage said radius changer gears to increase the effective radius of said sprocket assembly.

22. The variable ratio bicycle chain drive system of claim 15 wherein movement of said switch is operable during rotation of said sprocket assembly to allow both increase and decrease of the gear ratio changing during normal pedaling of a bicycle for continuous drive power.

23. The variable ratio bicycle chain drive system of claim 22 wherein the position of said switch is independent of any rotation of said sprocket assembly.

24. The variable ratio bicycle chain drive system of claim 15 wherein the sprocket assembly has an elliptical form.

* * * * *